United States Patent
Wadia et al.

(10) Patent No.: US 7,758,303 B1
(45) Date of Patent: Jul. 20, 2010

(54) FLADE FAN WITH DIFFERENT INNER AND OUTER AIRFOIL STAGGER ANGLES AT A SHROUD THEREBETWEEN

(75) Inventors: Aspi Rustom Wadia, Loveland, OH (US); Alan Glen Turner, Cincinnati, OH (US); Aaron Michael Dziech, Cincinnati, OH (US); Peter Nicholas Szucs, West Chester, OH (US); John Jared Decker, Cypress, TX (US)

(73) Assignee: General Electric Company, Schenectady, NY (US)

( * ) Notice: Subject to any disclaimer, the term of this patent is extended or adjusted under 35 U.S.C. 154(b) by 933 days.

(21) Appl. No.: 11/496,676

(22) Filed: Jul. 31, 2006

(51) Int. Cl.
*F01D 1/26* (2006.01)
(52) U.S. Cl. .................. 415/77; 416/193 R; 416/203
(58) Field of Classification Search .............. 415/77, 415/79; 416/175, 193 R, 194, 203, 196 R
See application file for complete search history.

(56) References Cited

U.S. PATENT DOCUMENTS

| | | | | |
|---|---|---|---|---|
| 1,263,473 | A * | 4/1918 | Schellens | 415/77 |
| 2,407,223 | A * | 9/1946 | Caldwell | 416/94 |
| 2,783,965 | A * | 3/1957 | Birmann | 415/175 |
| 2,999,631 | A * | 9/1961 | Wollmershauser | 416/191 |
| 3,186,166 | A * | 6/1965 | Grieb | 415/193 |
| 3,449,914 | A | 6/1969 | Brown | |
| 3,549,272 | A * | 12/1970 | Bouiller et al. | 416/166 |
| 4,022,544 | A * | 5/1977 | Garkusha et al. | 416/193 R |
| 4,043,121 | A | 8/1977 | Thomas et al. | |
| 4,751,816 | A * | 6/1988 | Perry | 60/226.1 |
| 5,261,227 | A | 11/1993 | Giffin, III | |
| 5,402,638 | A | 4/1995 | Johnson | |
| 5,404,713 | A | 4/1995 | Johnson | |
| 5,988,980 | A | 11/1999 | Busbey et al. | |
| 6,454,535 | B1 * | 9/2002 | Goshorn et al. | 416/203 |
| 2005/0047942 | A1 | 3/2005 | Griffin, III et al. | |
| 2005/0081509 | A1 | 4/2005 | Johnson | |
| 2005/0109012 | A1 | 5/2005 | Johnson | |
| 2006/0024162 | A1 | 2/2006 | Giffin | |
| 2006/0096272 | A1 | 5/2006 | Baughman et al. | |

FOREIGN PATENT DOCUMENTS

GB  2129502 A  *  5/1984

OTHER PUBLICATIONS

Smith, Hubert, The Illustrated Guide to Aerodynamics, 1992, McGraw-Hill, Inc., 2nd edtion, pp. 20-21.*

* cited by examiner

*Primary Examiner*—Richard Edgar
(74) *Attorney, Agent, or Firm*—William Scott Andes; Steven J. Rosen

(57) ABSTRACT

A FLADE fan assembly includes radially inner and outer airfoils extending radially inwardly and outwardly respectively from an annular shroud circumferentially disposed about a centerline. Inner and outer chords extend between inner and outer leading and trailing edges of inner and outer airfoil cross-sections of the radially inner and outer airfoils respectively. Inner and outer stagger angles between the inner and outer chords respectively at the shroud and the centerline are different. The radially outer airfoils may outnumber the radially inner airfoils and particularly by a ratio in a range of 1.5:1 to about 4:1. Load paths or radii may extend radially through the inner and outer airfoils and through the rotating shroud between the inner and outer airfoils and may pass near or through the inner and outer leading edges and through the inner and outer trailing edges.

59 Claims, 8 Drawing Sheets

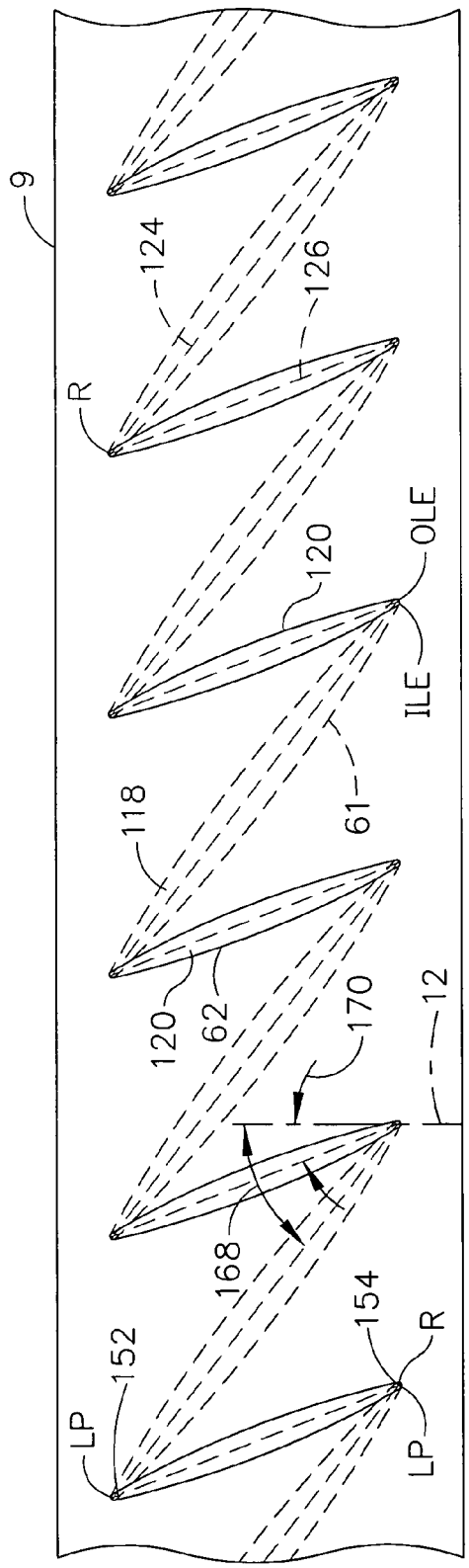
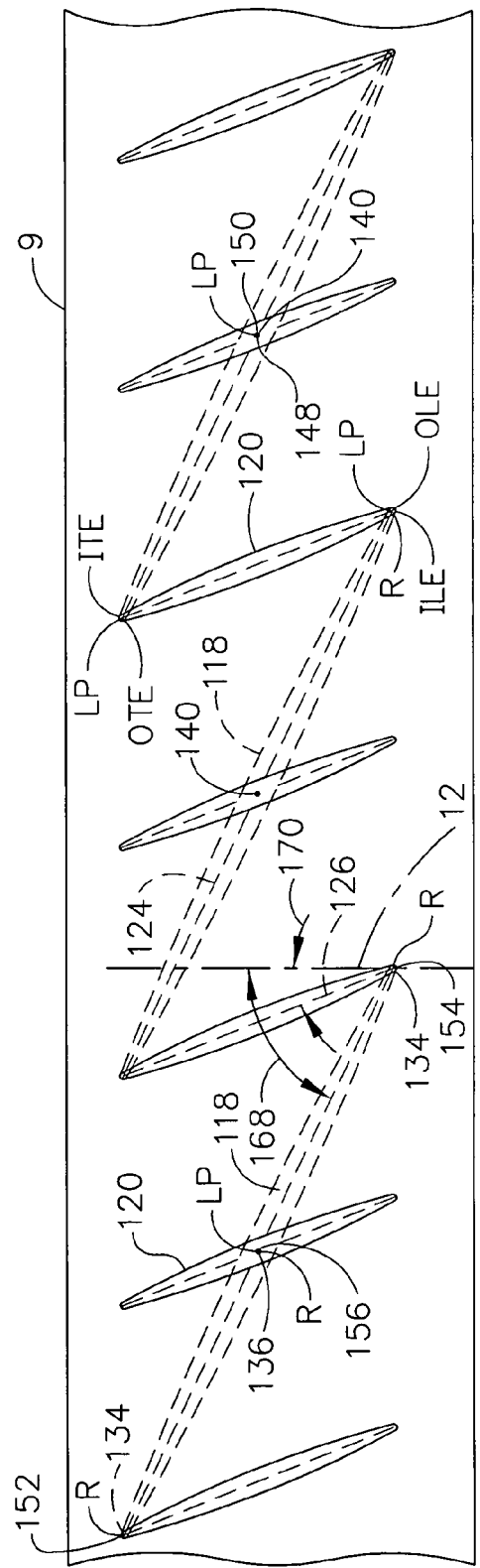

FLADE FAN WITH DIFFERENT INNER AND OUTER AIRFOIL STAGGER ANGLES AT A SHROUD THEREBETWEEN

The Government has rights in this invention pursuant to Contract No. F33615-03-D-2352 awarded by the Department of Defense.

BACKGROUND OF THE INVENTION

1. Field of the Invention

This invention relates to FLADE aircraft gas turbine engines and, more particularly, to such engines with counter-rotatable fans.

2. Description of Related Art

High performance variable cycle gas turbine engines are being designed because of their unique ability to operate efficiently at various thrust settings and flight speeds both subsonic and supersonic. An important feature of the variable cycle gas turbine engine which contributes to its high performance is its capability of maintaining a substantially constant inlet airflow as its thrust is varied. This feature leads to important performance advantages under less than full power engine settings or maximum thrust conditions, such as during subsonic cruise.

Counter-rotating fan gas turbine engines have also been designed and tested because of their unique and inherent ability to operate efficiently. Furthermore, counter-rotating fans powered by counter-rotating turbines eliminate the need for stator vanes in the fan section of the engine and at least one nozzle in the turbine section of the engine. This significantly decreases the weight of the engine. One issue regarding engine efficiency is the desirability of equalizing fan rotor torque between the counter-rotatable fans.

One particular type of variable cycle engine called a FLADE engine (FLADE being an acronym for "fan on blade") is characterized by an outer fan driven by a radially inner fan and discharging its flade air into an outer fan duct which is generally co-annular with and circumscribes an inner fan duct circumscribing the inner fan. One such engine disclosed in U.S. Pat. No. 4,043,121, entitled "Two Spool Variable Cycle Engine", by Thomas et al., provides a flade fan and outer fan duct within which variable guide vanes control the cycle variability by controlling the amount of air passing through the flade outer fan duct.

Other high performance aircraft variable cycle gas turbine FLADE engines capable of maintaining an essentially constant inlet airflow over a relatively wide range of thrust at a given set of subsonic flight ambient conditions such as altitude and flight Mach No. in order to avoid spillage drag and to do so over a range of flight conditions have been studied. This capability is particularly needed for subsonic part power engine operating conditions. Examples of these are disclosed in U.S. Pat. No. 5,404,713, entitled "Spillage Drag and Infrared Reducing Flade Engine", U.S. Pat. No. 5,402,963, entitled "Acoustically Shielded Exhaust System for High Thrust Jet Engines", U.S. Pat. No. 5,261,227, entitled "Variable Specific Thrust Turbofan Engine", and European Patent No. EP0567277, entitled "Bypass Injector Valve For Variable Cycle Aircraft Engines". Previously designed FLADE fans had the inner and outer portions of a fladed blade close to continuous in section properties at the transition region or shroud separating the inner and outer portions or the inner blade and outer FLADE fan blade. This in turn resulted in the same number of the inner blade and the outer FLADE fan blades.

It is highly desirable to have a counter-rotating fan aircraft gas turbine engine that can modulate bypass flow from a fan section around a core engine to the bypass stream and to effectively operate at high fan hub and bypass stream pressure ratios to provide high specific thrust at takeoff and climb power settings and to operate at low bypass stream pressure ratios to provide good specific fuel consumption during reduced power cruise operation. It is also desirable to provide counter-rotating fan engines to eliminate the stator vanes in the fan section of the engine, minimize the number of nozzles or vanes in the turbine, and equalize fan rotor torque between the counter-rotatable fans. It is also desirable to be able to design the inner fan blades and the outer FLADE fan blades for maximum efficiency.

SUMMARY OF THE INVENTION

A FLADE fan assembly includes radially inner and outer airfoils extending radially inwardly and outwardly respectively from a rotatable annular shroud circumferentially disposed about a centerline. Inner and outer chords extend between inner and outer leading and trailing edges of inner and outer airfoil cross-sections of the radially inner and outer airfoils respectively. Inner and outer stagger angles between the inner and outer chords respectively at the shroud and the centerline are different.

The radially outer airfoils may outnumber the radially inner airfoils and particularly by a ratio in a range of 1.5:1 to about 4:1. The FLADE fan assembly having the different inner and outer stagger angles is particularly useful in a FLADE counter-rotating fan aircraft gas turbine engine. The FLADE counter-rotating fan aircraft gas turbine engine includes axially spaced-apart upstream and downstream or forward and aft counter-rotatable fans circumferentially disposed about a centerline, at least one row of the FLADE fan blades having the radially outer airfoils disposed radially outwardly of and drivingly connected to one of the forward and aft counter-rotatable fans having radially inner airfoils. A more particular embodiment of the FLADE counter-rotating fan aircraft gas turbine engine includes the row of the FLADE fan blades drivingly connected to the aft counter-rotatable fan having radially inner airfoils.

BRIEF DESCRIPTION OF THE DRAWINGS

The foregoing aspects and other features of the invention are explained in the following description, taken in connection with the accompanying drawings where:

FIG. 7 is a schematical cross-sectional planform view illustration of the inner and outer airfoil cross-sections and the respective chords at the shroud for a ratio of outer airfoils to inner airfoils of 1:1.

FIG. 8 is a schematical cross-sectional planform view illustration of the inner and outer airfoil cross-sections and the respective chords at the shroud for a ratio of outer airfoils to inner airfoils of 2:1.

DETAILED DESCRIPTION OF THE INVENTION

Figure 1:
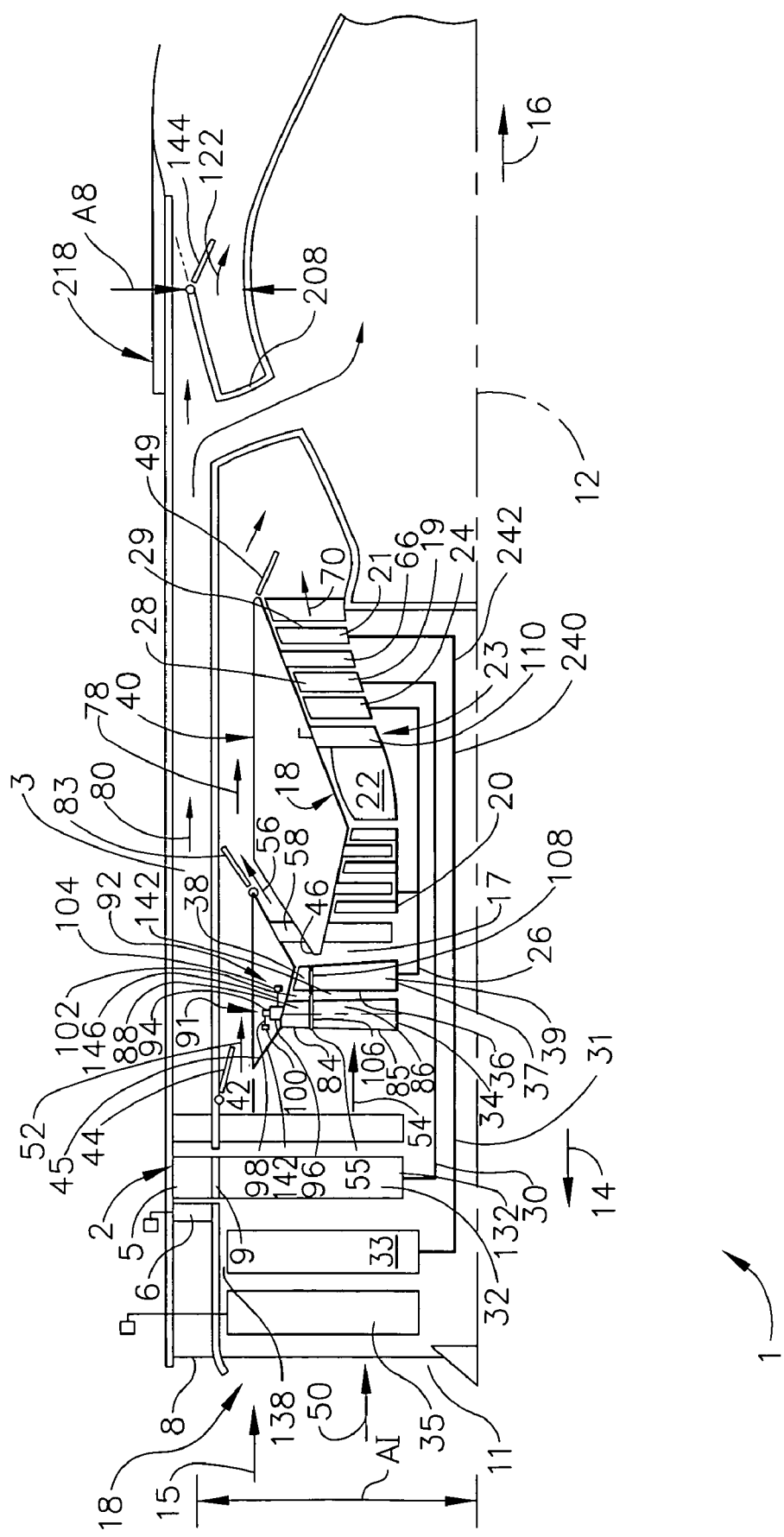
FIG. 1 is a schematical cross-sectional view illustration of a first exemplary embodiment of a FLADE aircraft gas turbine engine with chords of counter-rotatable fans having different stagger angles at inner and outer airfoil cross-sections at a shroud therebetween.
Figure 2:
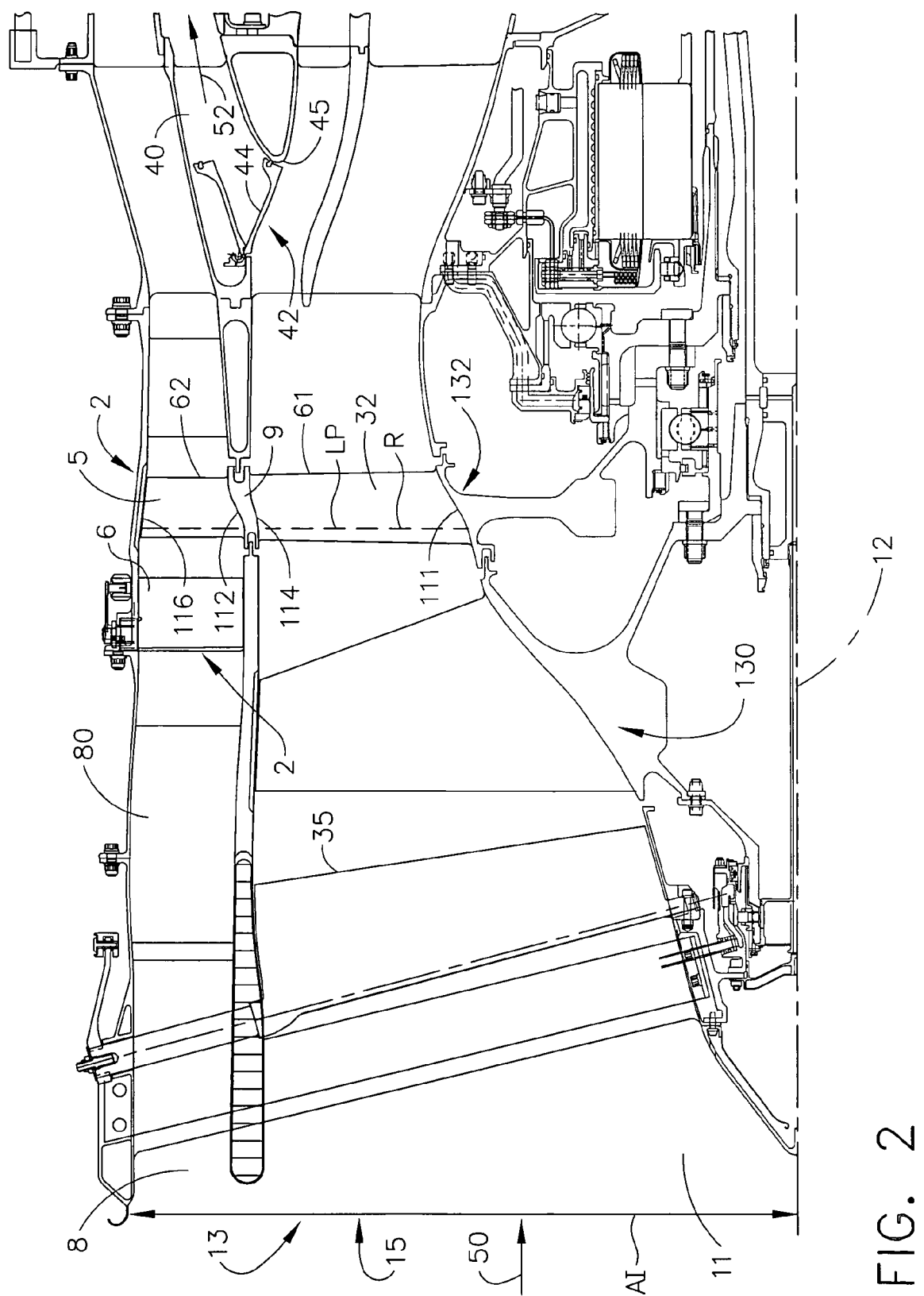
FIG. 2 is an enlarged cross-sectional view illustration of a fan section of a more particular embodiment of the engine illustrated in FIG. 1.
Figure 3:
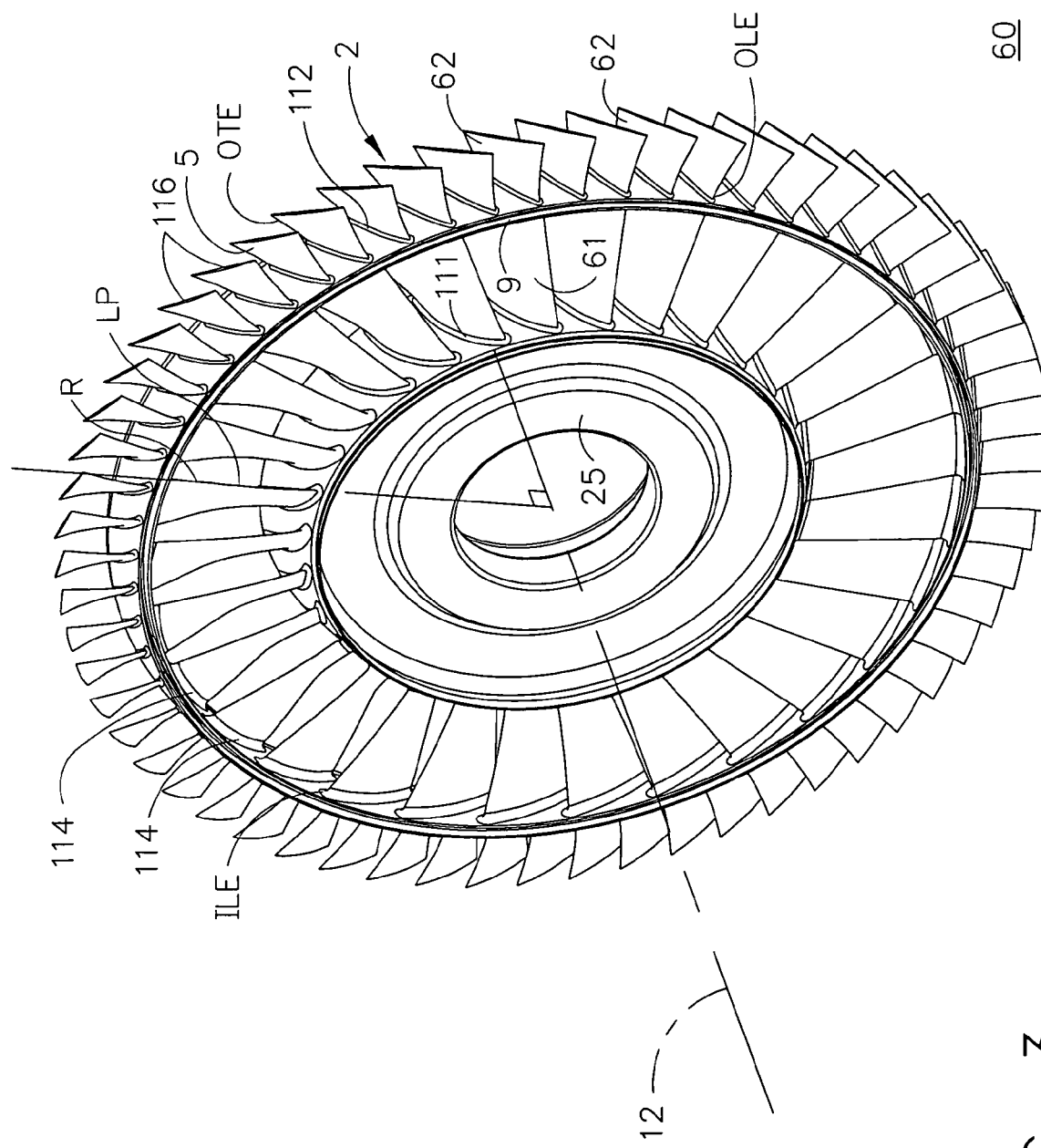
FIG. 3 is a perspective view illustration of the one of the fans engine illustrated in FIG. 2.

Illustrated in FIGS. 1-3 is a FLADE counter-rotating fan aircraft gas turbine engine 1 having a fan inlet 11 leading to upstream and downstream or forward and aft counter-rotatable fans 130, 132. A circumferential row of fan inlet guide vanes 35 is disposed between the fan inlet 11 and the forward counter-rotatable fan 130. The FLADE fan assembly 60 includes a FLADE fan 2 having at least one row of FLADE fan blades 5 disposed in a FLADE duct 3 through which FLADE airflow 80 is exhausted by the FLADE fan blades 5. The row of FLADE fan blades 5 is disposed radially outward of, operably connected to, and driven by one of the forward or aft counter-rotatable fans 130, 132. The FLADE fan blades 5 are disposed axially aft and downstream of variable FLADE inlet guide vanes 6. In FIG. 1, the aft fan 132 is illustrated as the FLADE fan having the row of FLADE fan blades 5. The FLADE fan 2 is disposed downstream of an annular FLADE inlet 8 to the FLADE duct 3. The FLADE inlet 8 and the fan inlet 11 in combination generally form a FLADE engine inlet 13 having a FLADE engine inlet area AI. The FLADE airflow 80 may be used for cooling such as cooling of a substantially hollow centerbody 72 or used for other purposes. Optionally, a portion of the FLADE airflow 80 may be injected into an exhaust flow 122 of the engine 1 through an aft FLADE variable area bypass injector door 144.

Downstream and axially aft of the forward and aft counter-rotatable fans 130, 132 is a core engine 18 having an annular core engine inlet 17 and a generally axially extending axis or centerline 12 generally extending forward 14 and aft 16. A fan bypass duct 40 located downstream and axially aft of the forward and aft counter-rotatable fans 130, 132 circumscribes the core engine 18. The FLADE duct 3 circumscribes the forward and aft counter-rotatable fans 130, 132 and the fan bypass duct 40.

One important criterion of inlet performance discussed is the ram recovery factor. A good inlet must have air-handling characteristics which are matched with the engine, as well as low drag and good flow stability. During supersonic operation of the engine, if AI is too small to handle the inlet airflow, the inlet shock moves downstream of the inlet throat and pressure recovery across the shock worsens and the exit corrected flow from the inlet increases to satisfy the engine demand. If AI is too large, the FLADE engine inlet 13 will supply more air than the engine can use resulting in excess drag (spillage drag), because we must either by-pass the excess air around the engine or "spill" it back out of the inlet. Too much air or too little air is detrimental to aircraft system performance. The FLADE fan 2 and the FLADE duct 3 are designed and operated to help manage the inlet airflow delivered by the inlet to the fans.

The fan inlet 11 is sized to receive essentially full engine airflow 15 of the engine at full power conditions with the FLADE engine inlet 13 essentially closed off by closing the variable FLADE inlet guide vanes 6. The engine is further designed and operated to fully open the inlet of the flade duct at predetermined part power flight conditions and essentially close it at full power conditions such as take-off. The aft counter-rotatable fan 132 has a single row of generally radially outwardly extending and circumferentially spaced-apart second fan blades 32. The FLADE fan blades 5 and the second fan blades 32 are separated by a rotatable annular shroud 9 to which the FLADE fan blades 5 are mounted. The forward counter-rotatable fan 130 has a single row of generally radially outwardly extending and circumferentially spaced-apart first fan blades 33. The FLADE fan blades 5 are primarily used to flexibly match inlet airflow requirements.

The FLADE fan assemblies disclosed in the prior art have radially inner fan blades and the radially outer blades or FLADE fan blades nearly continuous in section properties at a transition region of a flade fan shroud between the inner and outer blades. The prior art also discloses an equal number of FLADE fan blades and first or second fan blades, whichever they were attached to. In some prior art FLADE fan assemblies, the radially outer blades or FLADE fan blades are considered extensions of the radially inner fan blades.

Figure 4:
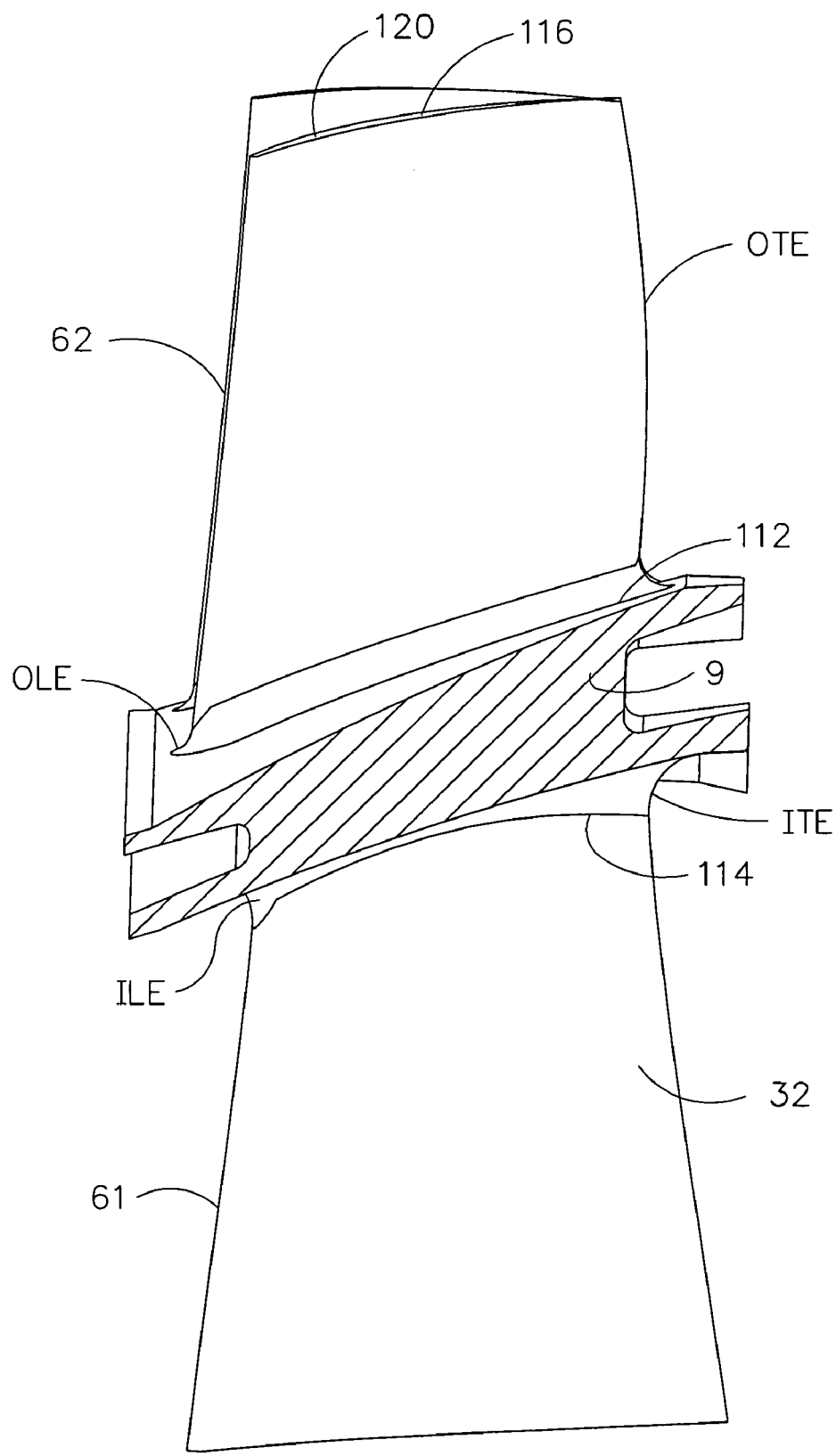
FIG. 4 is a perspective view illustration taken in a circumferential direction of a segment of the one of the fans illustrated in FIG. 2.
Figure 5:
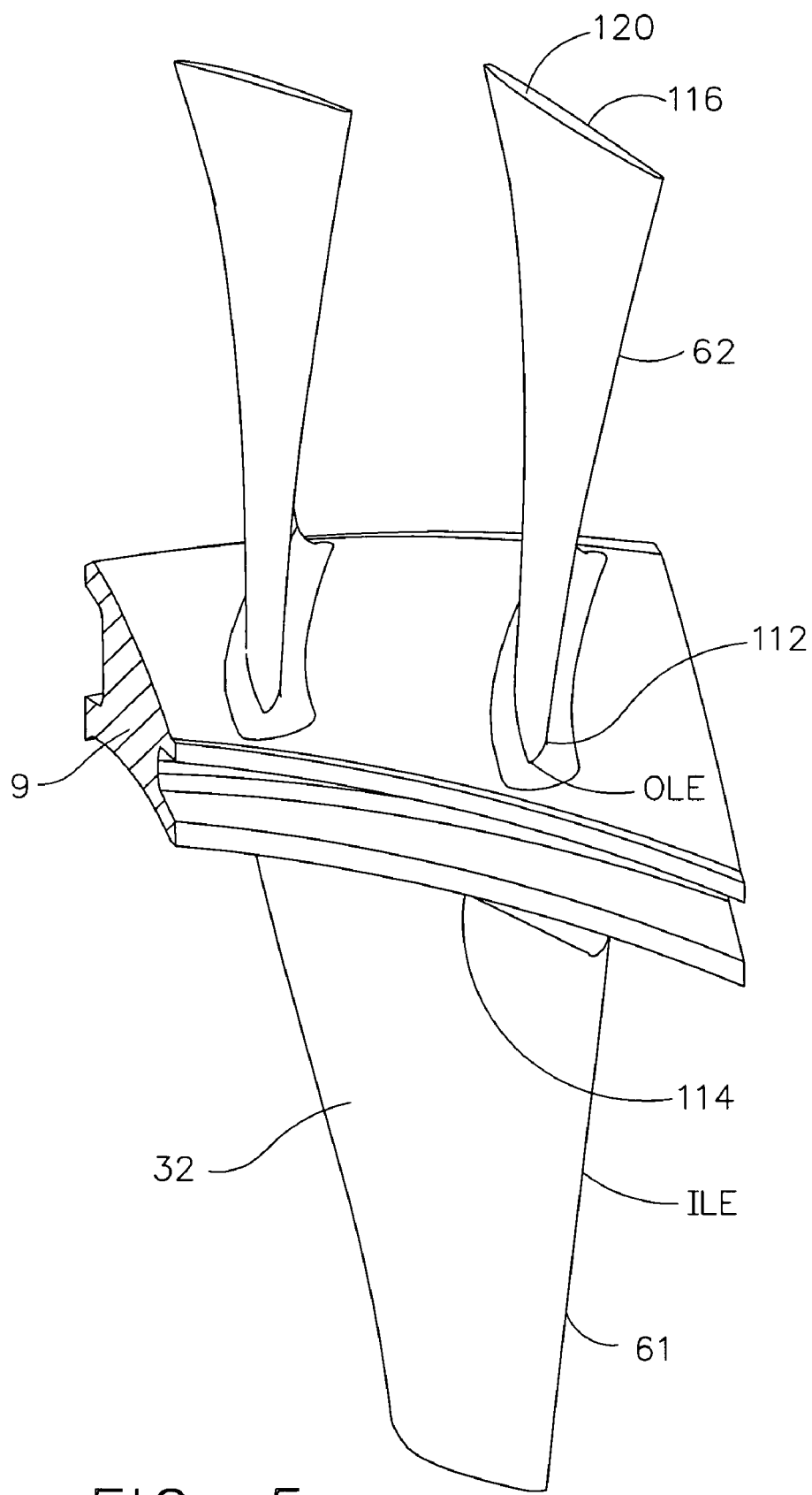
FIG. 5 is a forward looking aft perspective view illustration of the segment of the one of the fans illustrated in FIG. 2.
Figure 6:
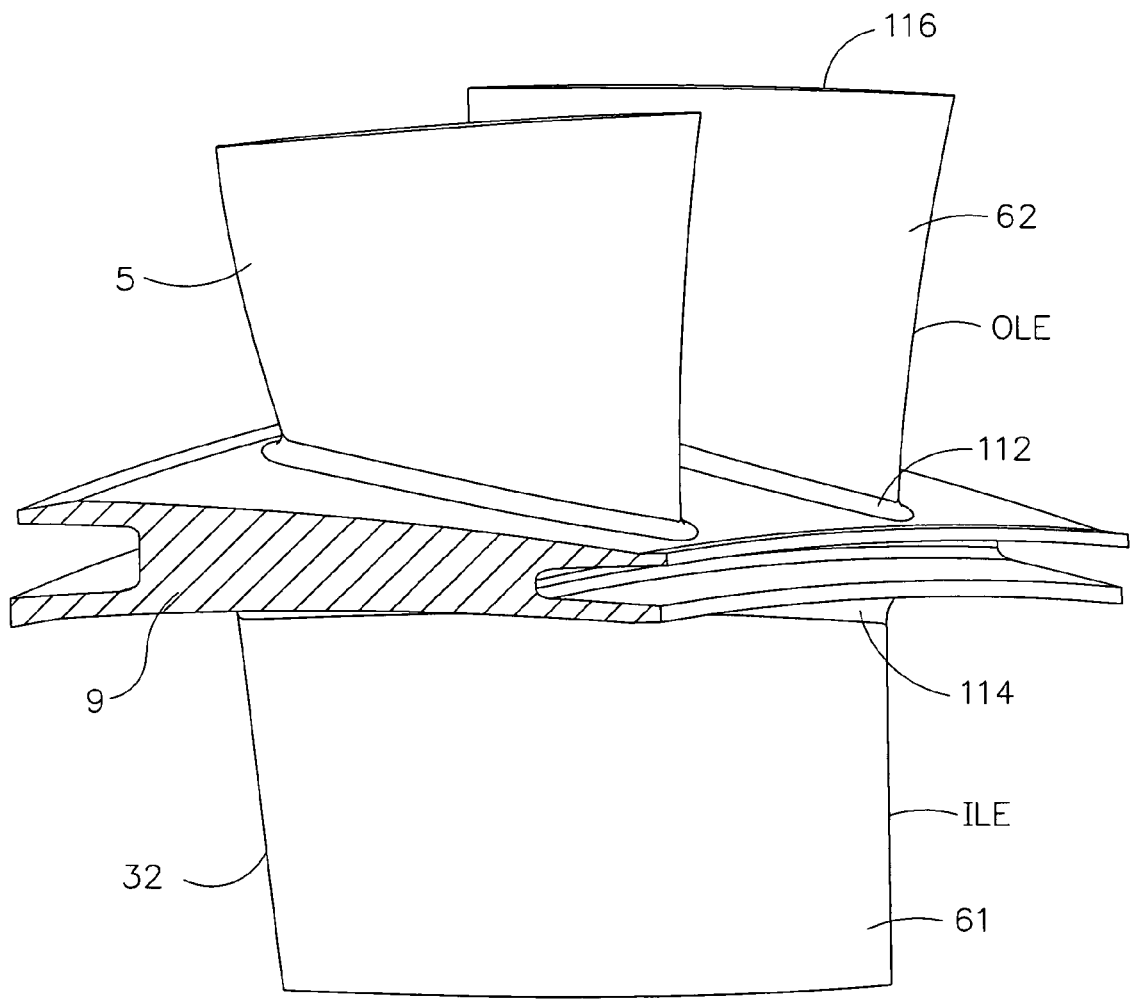
FIG. 6 is a perspective view illustration of the segment of the one of the fans illustrated in FIG. 2 normal to the inner blade.
Figure 9:
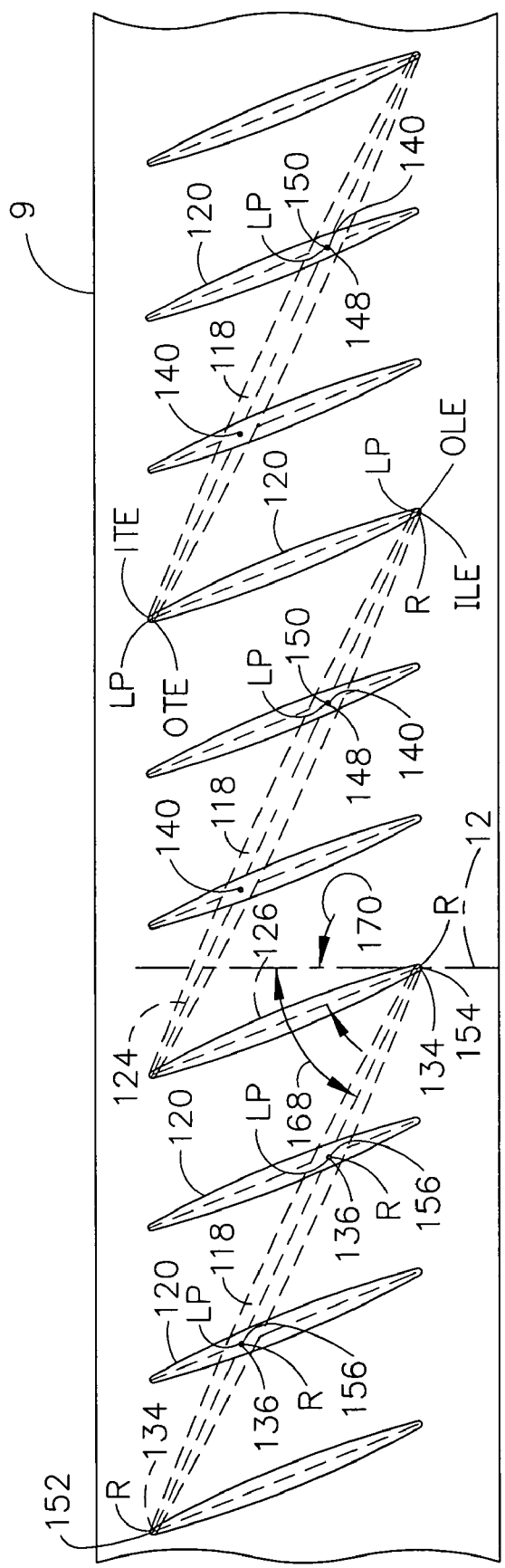
FIG. 9 is a schematical cross-sectional planform view illustration of the inner and outer airfoil cross-sections and the respective chords at the shroud for a ratio of outer airfoils to inner airfoils of 3:1.

The second fan blades 32 and the FLADE fan blades 5 include radially inner and outer airfoils 61, 62 circumferentially disposed about the centerline 12 and extending radially outwardly from radially inner and outer bases 111, 112 to radially inner and outer tips 114, 116, respectively as illustrated in FIGS. 2-6. Note that the FLADE fan assembly 60 illustrated herein is a single piece ring and that a segment of the assembly or ring is illustrated in FIGS. 4-6 to further illustrate a contour of the shroud 9 and the inner and outer airfoils 61, 62. Referring further to FIGS. 7, 8 and 9, the inner and outer airfoils 61, 62 have inner and outer airfoil cross-sections 118, 120 at the shroud 9. Inner and outer chords 124, 126 of the inner and outer airfoil cross-sections 118, 120 extend between inner and outer leading and trailing edges ILE, ITE and OLE, OTE of the inner and outer airfoils 61, 62 respectively. Inner and outer stagger angles 168, 170 are defined as angles between or with respect to the inner and outer chords 124, 126 at the shroud 9 and the centerline 12.

In order to optimize design and operation of at least one of the counter-rotatable fans, illustrated herein as the downstream or aft counter-rotatable fan 132 or the radially inner fan blade illustrated herein as the second fan blade 32, and to take advantage of the aerodynamic efficiency and lower rotational speed offered by the counter-rotatable fans, the inner and outer stagger angles 168, 170 are different. The FLADE fan blades 5 and the outer airfoils 62 equal the second fan blades 32 and the inner airfoils 61 in the exemplary embodiment of the FLADE fan assembly 60 illustrated in FIG. 7. The FLADE fan blades 5 and the outer airfoils 62 outnumber the second fan blades 32 and the inner airfoils 61 in the exemplary embodiments of the FLADE fan assembly 60 illustrated in FIGS. 8 and 9. Different embodiments of the FLADE fan assembly 60 may employ a ratio of the FLADE fan blades 5 and the outer airfoils 62 to the second fan blades 32 and the inner airfoils 61 in a range of 1.5:1 to 4:1. The ratio of FLADE fan blades 5 and the outer airfoils 62 to the second fan blades 32 and the inner airfoils 61 in the exemplary embodiment of the FLADE fan assembly 60 as illustrated in FIGS. 3-6 and 8 is 2:1. The ratio of FLADE fan blades 5 and the outer airfoils 62 to the second fan blades 32 and the inner airfoils 61 in the exemplary embodiment of the FLADE fan assembly 60 as illustrated in FIG. 7 is 1:1 and in FIG. 9 is 3:1.

Linear radial load paths LP extend radially along radii R from the centerline 12 and from a disk 25 of the aft counter-rotatable fan 132 through the inner and outer airfoils 61, 62 and the rotating shroud 9 between them. The exemplary embodiment of the FLADE fan assembly 60 illustrated in FIGS. 3-6 and 7 has two outer airfoils 62 for each of the inner airfoils 61 while the embodiment of the FLADE fan assembly 60 illustrated in FIG. 8 has three outer airfoils 62 for each two of the inner airfoils 61. A first portion 134 of the radially extending linear load paths LP passing near or through the inner and outer leading edges ILE, OLE and a second portion 136 of the radially extending linear load paths LP passing near or through the inner and outer trailing edges ITE, OTE.

The embodiment of the FLADE fan assembly 60 illustrated in FIG. 8 has three outer airfoils 62 for each two of the inner airfoils 61 and further includes a third portion 140 of the radially extending linear load paths LP passing through inner and outer points 148, 150 between the inner and outer trailing edges ITE, OTE along the inner and outer chords 124, 126 respectively. In general there may be multiple portions of the radially extending linear load paths LP passing through inner and outer points 148, 150 between the inner and outer trailing edges ITE, OTE along the inner and outer chords 124, 126 respectively. The inner and outer points 148, 150 need not be near the inner and/or the outer trailing edges ITE, OTE.

The exemplary FLADE fan assembly 60 may have one or more circumferential rows of the radii R. The exemplary embodiments of the FLADE fan assembly 60 illustrated in FIGS. 7, 8 and 9 include at least a first circumferential row 152 of the radii R extending radially outwardly from and normal to the centerline 12 and each one of the radii R in the first circumferential row 152 intersects one of the inner chords 124 and one of the outer chords 126. More particularly, a second circumferential row 154 of the radii R extends radially outwardly from and normal to the centerline 12, the radii R in the first circumferential row 152 pass near or through the inner and outer leading edges ILE, OLE, and the radii R in the second circumferential row 154 pass near or through the inner and outer trailing edges ITE, OTE. Illustrated in FIG. 8 is a third circumferential row 156 of the radii R extending radially outwardly from and normal to the centerline 12 wherein the radii R in the third circumferential row 156 pass between the inner and outer trailing edges ITE, OTE along the inner and outer chords 124, 126 respectively. In general, there may be multiple rows of the radii R intersecting the inner and outer chords 124, 126 respectively. The rows of the radii R need not intersect the inner and outer chords 124, 126 at or near the inner and/or the outer trailing edges ITE, OTE.

The variable FLADE inlet guide vanes 6 which controls swirl into the FLADE fan blades 5 and their outer airfoils 62, a contour of the shroud 9, the inner chord 124 are designed to achieve a desired angular and radial alignment between the inner and outer chords 124, 126 of the inner and outer airfoil cross-sections 118, 120, the inner and outer stagger angles 168, 170, and the intersection between the inner chords 124 and one of the outer chords 126. This results in a unique mixed-flow flowpath configuration at the radially inner tips 114 of the second fan blades 32 which helps reduce shock losses of the second fan blades 32. The embodiment of the FLADE fan assembly 60 having different inner and outer stagger angles 168, 170 as illustrated herein has a particular application to the aft counter-rotatable fan 132.

Referring back to FIG. 1, the core engine 18 includes, in downstream serial axial flow relationship, a core driven fan 37 having a row of core driven fan blades 36, a high pressure compressor 20, a combustor 22, and a high pressure turbine 23 having a row of high pressure turbine blades 24. A high pressure shaft 26 disposed coaxially about the centerline 12 of the engine 1 fixedly interconnects the high pressure compressor 20 and the high pressure turbine blades 24. The core engine 18 is effective for generating combustion gases. Pressurized air from the high pressure compressor 20 is mixed with fuel in the combustor 22 and ignited, thereby, generating combustion gases. Some work is extracted from these gases by the high pressure turbine blades 24 which drives the core driven fan 37 and the high pressure compressor 20. The high pressure shaft 26 rotates the core driven fan 37 having a single row of circumferentially spaced apart core driven fan blades 36 having generally radially outwardly located blade tip sections 38 separated from generally radially inwardly located blade hub sections 39 by an annular fan shroud 108.

The combustion gases are discharged from the core engine 18 into counter-rotatable first and second low pressure turbines 19, 21 having first and second rows of low pressure turbine blades 28, 29, respectively. The second low pressure turbine 21 is drivingly connected to the forward counter-rotatable fan 130 by a first low pressure shaft 30, the combination or assembly being designated a first low pressure spool 240. The first low pressure turbine 19 is drivingly connected to the aft counter-rotatable fan 132 by a second low pressure shaft 31, the combination or assembly being designated a second low pressure spool 242. The high pressure turbine 23 includes a row of high pressure turbine (HPT) nozzle stator vanes 110 which directs flow from the combustor 22 to the row of high pressure turbine blades 24.

Flow from the row of high pressure turbine blades 24 is then directed into the counter-rotatable second and first low pressure turbines 21 and 19 and the second and first rows of low pressure turbine blades 29 and 28, respectively. The exemplary embodiment of the engine 1 illustrated in FIGS. 1-2, includes a row of low pressure stator vanes 66 between the second and first rows of low pressure turbine blades 29 and 28. A variable throat area engine nozzle 218 having a variable nozzle throat A8 is downstream and axially aft of the counter-rotatable second low pressure turbine 21 and the fan bypass duct 40.

Referring to FIGS. 1 and 2, a first bypass inlet 42 to the fan bypass duct 40 is disposed axially between the aft counter-rotatable fan 132 and the annular core engine inlet 17 to the core engine 18, thereby, providing two coaxial bypass flowpaths into the fan bypass duct from the forward and aft counter-rotatable fans 130, 132. The first fan blades 33 of the forward counter-rotatable fan 130 and the second fan blades 32 of the aft counter-rotatable fan 132 are radially disposed across a first fan duct 138. The row of circumferentially spaced-apart fan inlet guide vanes 35 is radially disposed across the first fan duct 138, upstream and axially forward of the forward and aft counter-rotatable fan 130, 132. The first fan duct 138 contains the forward and aft counter-rotatable fans 130, 132 including the first and second fan blades 33, 32 and the row of circumferentially spaced-apart fan inlet guide vanes 35. The row of the core driven fan blades 36 of the core driven fan 37 are radially disposed across an annular second fan duct 142. The second fan duct 142 begins axially aft of the first bypass inlet 42 and is disposed radially inwardly of the fan bypass duct 40. An annular first flow splitter 45 is radially disposed between the first bypass inlet 42 and the second fan duct 142.

The full engine airflow 15 is split between the FLADE inlet 8 and the fan inlet 11. A fan airflow 50 passes through the fan inlet 11 and then the forward and aft counter-rotatable fans 130, 132.

A first bypass air portion 52 of the fan airflow 50 passes through the first bypass inlet 42 of the fan bypass duct 40 when a front variable area bypass injector (VABI) door 44 in the first bypass inlet 42 is open and with the remaining air portion 54 passing through the core driven fan 37 and its row of core driven fan blades 36. A row of circumferentially spaced-apart core driven fan stator vanes 34 within the second fan duct 142 are disposed axially between the row of second fan blades 32 and the core driven fan blades 36 of the core driven fan 37. The row of the core driven fan stator vanes 34 and the core driven fan blades 36 of the core driven fan 37 are radially disposed across the second fan duct 142. A vane shroud 106 divides the core driven fan stator vanes 34 into radially vane hub sections 85 and vane tip sections 84, respectively. The fan shroud 108 divides the core driven fan blades 36 into radially blade hub sections 39 and blade tip sections 38, respectively.

A second bypass airflow portion 56 is directed through a fan tip duct 146 across the vane tip sections 84 of the core driven fan stator vanes 34 and across the blade tip sections 38 of the core driven fan blades 36 into a second bypass inlet 46 of a second bypass duct 58 to the fan bypass duct 40. An optional middle variable area bypass injector (VABI) door 83 may be disposed at an aft end of the second bypass duct 58 for modulating flow through the second bypass inlet 46 to the fan bypass duct 40. An aft variable area bypass injector (VABI) door 49 is disposed at an aft end of the fan bypass duct 40 to mix bypass air 78 with core discharge air 70.

The fan tip duct 146 includes the vane and fan shrouds 106, 108 and a second flow splitter 55 at a forward end of the vane shroud 106. First and second varying means 91, 92 are provided for independently varying flow areas of the vane hub and tip sections 85, 84, respectively. Exemplary first and second varying means 91, 92 include independently variable vane hub and tip sections 85, 84, respectively (see U.S. Pat. No. 5,806,303). The independently variable vane hub and tip sections 85, 84 designs may include the entire vane hub and tip sections 85, 84 being independently pivotable. Other possible designs are disclosed in U.S. Pat. Nos. 5,809,772 and 5,988,890.

Another embodiment of the independently variable vane hub and tip sections 85, 84 includes pivotable trailing-edge hub and tip flaps 86, 88 of the independently variable vane hub and tip sections 85, 84 as illustrated in FIG. 1. The first and second varying means 91, 92 can include independently pivoting flaps. Alternative varying means for non-pivotable fan stator vane designs include axially moving unison rings and those means known for mechanical clearance control in jet engines (i.e., mechanically moving circumferentially surrounding shroud segments radially towards and away from a row of rotor blade tips to maintain a constant clearance despite different rates of thermal expansion and contraction). Additional such varying means for non-pivotable, fan stator vane designs include those known for extending and retracting wing flaps on airplanes and the like.

Exemplary first and second varying means 91, 92, illustrated in FIG. 1 include an inner shaft 94 coaxially disposed within an outer shaft 96. The inner shaft 94 is rotated by a first lever arm 98 actuated by a first unison ring 100. The outer shaft 96 is rotated by a second lever arm 102 actuated by a second unison ring 104. The inner shaft 94 is attached to the pivotable trailing edge hub flap 86 of the vane hub section 85 of the fan stator vane 34. The outer shaft 96 is attached to the pivotable trailing edge tip flap 88 of the vane tip section 84 of the fan stator vane 34. Note that the lever arms 98, 102 and the unison rings 100, 104 are all disposed radially outward of the fan stator vanes 34.

The forward and aft counter-rotatable fans 130, 132 in counter-rotating fan engines allows the elimination of a row of stator vanes between the counter-rotatable fans in the fan section of the engine and also help to minimize the number of nozzles or vanes in the turbine. The savings in weight and cost due to the removal of the fan stator vanes is traded against the complexity of adding a third spool, namely one of the forward and aft counter-rotating low pressure spools. Counter-rotating fan engines typically have a wheel speed of the aft counter-rotatable fan 132 that is somewhat lower than that of the forward counter-rotatable fan 130. This is one reason for selecting the aft counter-rotatable fan 132 upon which to mount the row of FLADE fan blades 5. An elevated relative Mach number into the aft counter-rotatable fan 132 is the reason for its lower wheel speed and it is a result of the counter-swirl imparted by the forward counter-rotatable fan 130. The lower wheel speed of the aft counter-rotatable fan 132 suggests a reduced work fraction on it to equalize the net fan rotor torque. In this manner, the exit swirl from the aft counter-rotatable fan 132 is sufficiently small so no downstream straightening vanes are required. One exemplary speed ratio of the aft counter-rotatable fan 132 to the forward counter-rotatable fan 130, (speed of rotor 2/speed of rotor 1), is 0.75 which also the work ratio of the two fans. The resulting work split is 57.5% for the forward counter-rotatable fan 130 and the remaining 42.5% for the aft counter-rotatable fan 132. Current studies suggest that energy requirements of the row of FLADE fan blades 5 is in a range of 15 to 30 percent of the overall fan energy.

One problem with counter-rotatable fans is an area ratio requirement across the first low pressure turbine 19. Prudent design practice suggests little or no outward slope over the turbine rotor to lessen turbine blade tip clearance migrations with the axial migration of the turbine rotor. Design practice also constrains turbine blade hub slope to less that about 30 degrees to avoid excessive aerodynamic loss in this region. It is desirable to avoid first low pressure turbines having rotor pressure ratios in excess of about 1.45. Turbines rotor pressure ratio is defined turbine blade inlet pressure divided by turbine blade exit pressure. Prior counter-rotatable fan engine designs indicate that first low pressure turbines have pressure ratios of about 1.9. This is far more than what is desirable.

The total work on the second low pressure spool 242 is the sum of the work performed by the aft counter-rotatable fan 132 plus the work performed by have the FLADE fan blades 5. The total work extracted by the first low pressure turbine 19, which is drivingly connected to the aft counter-rotatable fan 132, requires a first low pressure turbine 19 pressure ratio well in excess of the above noted limit for a no turbine nozzle configuration. A solution to this problem is to reduce the work requirement of the aft counter-rotatable fan 132 to a point consistent with a first low pressure turbine 19 pressure ratio of about 1.45. The reduced work of the aft counter-rotatable fan 132 is then added to the work required by forward counter-rotatable fan 130, thereby restoring the total fan work.

Adequate fan stall margin must be retained with the revised stage pressure ratio requirements. Rotor speeds of the forward and aft counter-rotatable fans 130, 132 are determined by their respective pressure ratio requirements. The rotor speed of the aft counter-rotatable fan 132 is determined by its pressure ratio requirement or alternatively by the pressure ratio requirement of the FLADE fan blades 5. The resulting work ratio for the aft counter-rotatable fan 132 in the engine illustrated in FIGS. 1-3 is about 0.43 and its speed ratio is about 0.73.

The flade airflow 80 may be modulated using the variable FLADE inlet guide vanes 6 to provide maximum engine airflow capability at take-off operating conditions for noise abatement or for engine-inlet airflow matching during flight. At supersonic cruise conditions the flade airflow may be reduced to its least energy absorbing airflow to permit the highest attainable specific thrust. The flade airflow modulation may alter the work requirement of the first low pressure turbine 19 of the second low pressure spool 242. However, the first low pressure turbine 19 and its first row of low pressure turbine blades 28 is nested between the row of high pressure turbine blades 24 of the high pressure turbine 23 and the second low pressure turbine 21 and its second row of low pressure turbine blades 29.

The first low pressure turbine 19 inlet flow function is expected to remain relatively constant over its steady state operating space. The second low pressure turbine 21 inlet flow function is also expected to remain relatively constant over its steady state operating regime. Accordingly, the pressure ratio of the first low pressure turbine 19 is expected to remain relatively constant. At constant pressure ratio the work output of the first low pressure turbine 19 will remain relatively constant. This constant work output of the first low pressure turbine 19 coupled with the reduced work input requirement of the first low pressure spool 240, due to closure of the variable FLADE inlet guide vanes 6 and the row of FLADE fan blades 5 would create a torque imbalance and cause an acceleration of the low pressure spool 240. The pressure ratio across the first low pressure turbine 19 must be modulated to prevent this excess torque. The modulation is accomplished by varying the row of variable low pressure stator vanes 66 between the first and second rows of low pressure turbine blades 28, 29 to adjust inlet flow to the second row of low pressure turbine blades 29. A variable throat area A8 helps to avoid over extraction by the first low pressure turbine 19.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A FLADE counter-rotating fan aircraft gas turbine engine comprising:
   axially spaced-apart forward and aft counter-rotatable fans circumferentially disposed about a centerline,
   at least one row of FLADE fan blades having radially outer airfoils disposed radially outwardly of and drivingly connected to one of the forward and aft counter-rotatable fans having radially inner airfoils,
   an annular shroud disposed between the radially inner and outer airfoils,
   the radially inner and outer airfoils extending radially inwardly and outwardly respectively from the annular shroud,
   a core engine and in flow receiving relationship with and located downstream of the radially inner airfoils, and
   a bypass duct surrounding the core engine and in flow receiving relationship with and located downstream of the radially outer airfoils,
   inner and outer chords extending between inner and outer leading and trailing edges of inner and outer airfoil cross-sections of the radially inner and outer airfoils respectively,
   inner and outer stagger angles between the inner and outer chords respectively at the annular shroud and the centerline, and
   the inner and outer stagger angles being different.

2. An engine as claimed in claim 1 further comprising the radially outer airfoils outnumbering the radially inner airfoils.

3. An engine as claimed in claim 2 further comprising the radially outer airfoils outnumbering the radially inner airfoils by a ratio in a range of 1.5:1 to about 4:1.

4. An engine as claimed in claim 2 further comprising the radially outer airfoils outnumbering the radially inner airfoils by a ratio of 2:1.

5. An engine as claimed in claim 2 further comprising the radially outer airfoils outnumbering the radially inner airfoils by a ratio of 1.5:1.

6. An engine as claimed in claim 2 further comprising radially extending linear load paths extend radially along radii from the centerline through the inner and outer airfoils and through the annular shroud between the inner and outer airfoils.

7. An engine An assembly as claimed in claim 6 further comprising the radially outer airfoils outnumbering the radially inner airfoils by a ratio in a range of 1.5:1 to about 4:1.

8. An engine as claimed in claim 6 further comprising the radially outer airfoils outnumbering the radially inner airfoils by a ratio of 2:1.

9. An engine as claimed in claim 6 further comprising the radially outer airfoils outnumbering the radially inner airfoils by a ratio of 1.5:1.

10. An engine as claimed in claim 6 further comprising:
    inner and outer airfoil cross-sections of the inner and outer airfoils at the annular shroud,
    inner and outer chords extending between inner and outer leading and trailing edges of the inner and outer airfoil cross-sections respectively,
    a first portion of the radially extending linear load paths passing near or through the inner and outer leading edges, and
    a second portion of the radially extending linear load paths passing near or through the inner and outer trailing edges.

11. An engine as claimed in claim 6 further comprising:
    inner and outer airfoil cross-sections of the inner and outer airfoils at the annular shroud,
    inner and outer chords extending between inner and outer leading and trailing edges of the inner and outer airfoil cross-sections respectively,
    a first portion of the radially extending linear load paths passing near or through the inner and outer leading edges,
    a second portion of the radially extending linear load paths passing near or through the inner and outer trailing edges, and
    a third portion of the radially extending linear load paths passing through inner and outer points between the inner and outer trailing edges along the inner and outer chords respectively.

12. An engine as claimed in claim 6 further comprising:
    inner and outer airfoil cross-sections of the inner and outer airfoils at the annular shroud,
    inner and outer chords extending between inner and outer leading and trailing edges of the inner and outer airfoil cross-sections respectively, and
    multiple portions of the radially extending linear load paths passing through inner and outer points between the inner and outer trailing edges along the inner and outer chords respectively.

13. An engine as claimed in claim 2 further comprising:
    inner and outer airfoil cross-sections of the inner and outer airfoils at the annular shroud, inner and outer chords extending between inner and outer leading and trailing edges of the inner and outer airfoil cross-sections respectively, at least a first circumferential row of radii extending radially outwardly from and normal to the centerline, and each radius of the radii intersecting one of the inner chords and one of the outer chords.

14. An engine as claimed in claim 13 further comprising:

a second circumferential row of the radii extending radially outwardly from and normal to the centerline, the radii in the first circumferential row passing near or through the inner and outer leading edges, and the radii in the second circumferential row passing near or through the inner and outer trailing edges.

15. An engine as claimed in claim 14 further comprising a third circumferential row of the radii extending radially outwardly from and normal to the centerline and the radii in the third circumferential row passing between the inner and outer trailing edges along the inner and outer chords respectively.

16. A FLADE counter-rotating fan aircraft gas turbine engine comprising:

axially spaced-apart forward and aft counter-rotatable fans circumferentially disposed about a centerline, at least one row of FLADE fan blades having radially outer airfoils disposed radially outwardly of and drivingly connected to one of the forward and aft counter-rotatable fans having radially inner airfoils, an annular shroud disposed between the radially inner and outer airfoils, the radially inner and outer airfoils extending radially inwardly and outwardly respectively from the annular shroud, inner and outer chords extending between inner and outer leading and trailing edges of inner and outer airfoil cross-sections of the radially inner and outer airfoils respectively, inner and outer stagger angles between the inner and outer chords respectively at the annular shroud and the centerline, the inner and outer stagger angles being different, and the radially outer airfoils outnumbering the radially inner airfoils.

17. An engine as claimed in claim 16 further comprising the radially outer airfoils outnumbering the radially inner airfoils by a ratio in a range of 1.5:1 to about 4:1.

18. An engine as claimed in claim 16 further comprising the radially outer airfoils outnumbering the radially inner airfoils by a ratio of 2:1.

19. An engine as claimed in claim 16 further comprising the radially outer airfoils outnumbering the radially inner airfoils by a ratio of 1.5:1.

20. An engine as claimed in claim 16 further comprising radially extending linear load paths extend radially along radii from the centerline through the inner and outer airfoils and through the annular shroud between the inner and outer airfoils.

21. An engine as claimed in claim 20 further comprising the radially outer airfoils outnumbering the radially inner airfoils by a ratio in a range of 1.5:1 to about 4:1.

22. An engine as claimed in claim 20 further comprising the radially outer airfoils outnumbering the radially inner airfoils by a ratio of 2:1.

23. An engine as claimed in claim 20 further comprising the radially outer airfoils outnumbering the radially inner airfoils by a ratio of 1.5:1.

24. An engine as claimed in claim 20 further comprising:

inner and outer airfoil cross-sections of the inner and outer airfoils at the annular shroud, inner and outer chords extending between inner and outer leading and trailing edges of the inner and outer airfoil cross-sections respectively, a first portion of the radially extending linear load paths passing near or through the inner and outer leading edges, and a second portion of the radially extending linear load paths passing near or through the inner and outer trailing edges.

25. An engine as claimed in claim 20 further comprising:

inner and outer airfoil cross-sections of the inner and outer airfoils at the annular shroud, inner and outer chords extending between inner and outer leading and trailing edges of the inner and outer airfoil cross-sections respectively, a first portion of the radially extending linear load paths passing near or through the inner and outer leading edges, a second portion of the radially extending linear load paths passing near or through the inner and outer trailing edges, and a third portion of the radially extending linear load paths passing through inner and outer points between the inner and outer trailing edges along the inner and outer chords respectively.

26. An engine as claimed in claim 20 further comprising:

inner and outer airfoil cross-sections of the inner and outer airfoils at the annular shroud, inner and outer chords extending between inner and outer leading and trailing edges of the inner and outer airfoil cross-sections respectively, and multiple portions of the radially extending linear load paths passing through inner and outer points between the inner and outer trailing edges along the inner and outer chords respectively.

27. An engine as claimed in claim 16 further comprising:

inner and outer airfoil cross-sections of the inner and outer airfoils at the annular shroud, inner and outer chords extending between inner and outer leading and trailing edges of the inner and outer airfoil cross-sections respectively, at least a first circumferential row of radii extending radially outwardly from and normal to the centerline, and each radius of the radii intersecting one of the inner chords and one of the outer chords.

28. An engine as claimed in claim 27 further comprising:

a second circumferential row of the radii extending radially outwardly from and normal to the centerline, the radii in the first circumferential row passing near or through the inner and outer leading edges, and the radii in the second circumferential row passing near or through the inner and outer trailing edges.

29. An engine as claimed in claim 28 further comprising a third circumferential row of the radii extending radially outwardly from and normal to the centerline and the radii in the third circumferential row passing between the inner and outer trailing edges along the inner and outer chords respectively.

30. A FLADE counter-rotating fan aircraft gas turbine engine comprising:

axially spaced-apart forward and aft counter-rotatable fans circumferentially disposed about a centerline, at least one row of FLADE fan blades having radially outer airfoils disposed radially outwardly of and drivingly connected to the aft counter-rotatable fan having radially inner airfoils, an annular shroud disposed between the radially inner and outer airfoils, the radially inner and outer airfoils extending radially inwardly and outwardly respectively from the annular shroud, inner and outer chords extending between inner and outer leading and trailing edges of inner and outer airfoil cross-sections of the radially inner and outer airfoils respectively, inner and outer stagger angles between the inner and outer chords respectively at the annular shroud and the centerline, and the inner and outer stagger angles being different and the radially outer airfoils outnumbering the radially inner airfoils.

31. An engine as claimed in claim 30 further comprising the radially outer airfoils outnumbering the radially inner airfoils by a ratio in a range of 1.5:1 to about 4:1.

32. An engine as claimed in claim 30 further comprising the radially outer airfoils outnumbering the radially inner airfoils by a ratio of 2:1.

33. An engine as claimed in claim 30 further comprising the radially outer airfoils outnumbering the radially inner airfoils by a ratio of 1.5:1.

34. An engine as claimed in claim 30 further comprising radially extending linear load paths extend radially along radii from the centerline through the inner and outer airfoils and through the annular shroud between the inner and outer airfoils.

35. An engine as claimed in claim 34 further comprising the radially outer airfoils outnumbering the radially inner airfoils by a ratio in a range of 1.5:1 to about 4:1.

36. An engine as claimed in claim 34 further comprising the radially outer airfoils outnumbering the radially inner airfoils by a ratio of 2:1.

37. An engine as claimed in claim 34 further comprising the radially outer airfoils outnumbering the radially inner airfoils by a ratio of 1.5:1.

38. An engine as claimed in claim 34 further comprising:
inner and outer airfoil cross-sections of the inner and outer airfoils at the annular shroud,
inner and outer chords extending between inner and outer leading and trailing edges of the inner and outer airfoil cross-sections respectively,
a first portion of the radially extending linear load paths passing near or through the inner and outer leading edges, and
a second portion of the radially extending linear load paths passing near or through the inner and outer trailing edges.

39. An engine as claimed in claim 34 further comprising:
inner and outer airfoil cross-sections of the inner and outer airfoils at the annular shroud,
inner and outer chords extending between inner and outer leading and trailing edges of the inner and outer airfoil cross-sections respectively,
a first portion of the radially extending linear load paths passing near or through the inner and outer leading edges,
a second portion of the radially extending linear load paths passing near or through the inner and outer trailing edges, and a third portion of the radially extending linear load paths passing through inner and outer points between the inner and outer trailing edges along the inner and outer chords respectively.

40. An engine as claimed in claim 34 further comprising:
inner and outer airfoil cross-sections of the inner and outer airfoils at the annular shroud,
inner and outer chords extending between inner and outer leading and trailing edges of the inner and outer airfoil cross-sections respectively, and
multiple portions of the radially extending linear load paths passing through inner and outer points between the inner and outer trailing edges along the inner and outer chords respectively.

41. An engine as claimed in claim 30 further comprising:
inner and outer airfoil cross-sections of the inner and outer airfoils at the annular shroud,
inner and outer chords extending between inner and outer leading and trailing edges of the inner and outer airfoil cross-sections respectively,
at least a first circumferential row of radii extending radially outwardly from and normal to the centerline, and
each radius of the radii intersecting one of the inner chords and one of the outer chords.

42. An engine as claimed in claim 41 further comprising:
a second circumferential row of the radii extending radially outwardly from and normal to the centerline,
the radii in the first circumferential row passing near or through the inner and outer leading edges, and
the radii in the second circumferential row passing near or through the inner and outer trailing edges.

43. An engine as claimed in claim 42 further comprising a third circumferential row of the radii extending radially outwardly from and normal to the centerline and the radii in the third circumferential row passing between the inner and outer trailing edges along the inner and outer chords respectively.

44. An aircraft gas turbine engine comprising:
a FLADE fan circumferentially disposed about a centerline and having at least one row of FLADE fan blades disposed in a FLADE duct,
the FLADE fan including radially inner and outer airfoils extending radially inwardly and outwardly respectively from an annular shroud circumferentially disposed about a centerline,
inner and outer chords extending between inner and outer leading and trailing edges of inner and outer airfoil cross-sections of the radially inner and outer airfoils respectively,
inner and outer stagger angles between the inner and outer chords respectively at the annular shroud and the centerline, and
the inner and outer stagger angles being different,
a core engine and in flow receiving relationship with and located downstream of the radially inner airfoils, and
a bypass duct surrounding the core engine and in flow receiving relationship with and located downstream of the radially outer airfoils.

45. An engine as claimed in claim 44 further comprising the radially outer airfoils outnumbering the radially inner airfoils.

46. An engine as claimed in claim 45 further comprising the radially outer airfoils outnumbering the radially inner airfoils by a ratio in a range of 1.5:1 to about 4:1.

47. An engine as claimed in claim 45 further comprising the radially outer airfoils outnumbering the radially inner airfoils by a ratio of 2:1.

48. An engine as claimed in claim 45 further comprising the radially outer airfoils outnumbering the radially inner airfoils by a ratio of 1.5:1.

49. An engine as claimed in claim 45 further comprising radially extending linear load paths extend radially along radii from the centerline through the inner and outer airfoils and through the annular shroud between the inner and outer airfoils.

50. An engine as claimed in claim 49 further comprising the radially outer airfoils outnumbering the radially inner airfoils by a ratio in a range of 1.5:1 to about 4:1.

51. An engine as claimed in claim 49 further comprising the radially outer airfoils outnumbering the radially inner airfoils by a ratio of 2:1.

52. An engine as claimed in claim 49 further comprising the radially outer airfoils outnumbering the radially inner airfoils by a ratio of 1.5:1.

53. An engine as claimed in claim 49 further comprising:
- inner and outer airfoil cross-sections of the inner and outer airfoils at the annular shroud,
- inner and outer chords extending between inner and outer leading and trailing edges of the inner and outer airfoil cross-sections respectively,
- a first portion of the radially extending linear load paths passing near or through the inner and outer leading edges, and
- a second portion of the radially extending linear load paths passing near or through the inner and outer trailing edges.

54. An engine as claimed in claim 49 further comprising:
- inner and outer airfoil cross-sections of the inner and outer airfoils at the annular shroud,
- inner and outer chords extending between inner and outer leading and trailing edges of the inner and outer airfoil cross-sections respectively,
- a first portion of the radially extending linear load paths passing near or through the inner and outer leading edges,
- a second portion of the radially extending linear load paths passing near or through the inner and outer trailing edges, and
- a third portion of the radially extending linear load paths passing through inner and outer points between the inner and outer trailing edges along the inner and outer chords respectively.

55. An engine as claimed in claim 49 further comprising:
- inner and outer airfoil cross-sections of the inner and outer airfoils at the annular shroud,
- inner and outer chords extending between inner and outer leading and trailing edges of the inner and outer airfoil cross-sections respectively, and
- multiple portions of the radially extending linear load paths passing through inner and outer points between the inner and outer trailing edges along the inner and outer chords respectively.

56. An engine as claimed in claim 45 further comprising:
- inner and outer airfoil cross-sections of the inner and outer airfoils at the annular shroud,
- inner and outer chords extending between inner and outer leading and trailing edges of the inner and outer airfoil cross-sections respectively,
- at least a first circumferential row of radii extending radially outwardly from and normal to the centerline, and
- each radius of the radii intersecting one of the inner chords and one of the outer chords.

57. An engine as claimed in claim 56 further comprising:
- a second circumferential row of the radii extending radially outwardly from and normal to the centerline,
- the radii in the first circumferential row passing near or through the inner and outer leading edges, and
- the radii in the second circumferential row passing near or through the inner and outer trailing edges.

58. An engine as claimed in claim 57 further comprising a third circumferential row of the radii extending radially outwardly from and normal to the centerline and the radii in the third circumferential row passing between the inner and outer trailing edges along the inner and outer chords respectively.

59. An engine as claimed in claim 44 further comprising variable FLADE inlet guide vanes disposed axially forward and upstream of the outer airfoils.

* * * * *